United States Patent
Sun et al.

(10) Patent No.: US 12,459,082 B2
(45) Date of Patent: Nov. 4, 2025

(54) ADJUSTABLE CLAMP FINGER DESIGN

(71) Applicant: SEMICONDUCTOR COMPONENTS INDUSTRIES, LLC, Phoenix, AZ (US)

(72) Inventors: Sen Sun, Suzhou (CN); Kun Feng, Shanghai (CN); Hu Cheng, Suzhou (CN); Naima Wang, Wuzhong District (CN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 337 days.

(21) Appl. No.: 17/819,469

(22) Filed: Aug. 12, 2022

(65) Prior Publication Data

US 2024/0051089 A1    Feb. 15, 2024

(51) Int. Cl.
   *B25B 1/24*   (2006.01)
(52) U.S. Cl.
   CPC ................. *B25B 1/2405* (2013.01)
(58) Field of Classification Search
   CPC ..... B25B 1/2405; B25B 1/2473; B25B 5/105; B25B 5/106; H01L 21/68728; H01L 21/68785; H01L 21/67144
   See application file for complete search history.

(56) References Cited

U.S. PATENT DOCUMENTS

| | | | |
|---|---|---|---|
| 2,203,162 A * | 6/1940 | Lee ........................... | B23C 7/00 451/365 |
| 2,339,897 A * | 1/1944 | Wetzler ................... | B25B 5/106 269/171.5 |
| 2,888,052 A * | 5/1959 | Reason ..................... | B23Q 3/06 269/91 |
| 3,312,461 A * | 4/1967 | Copron ..................... | B25B 1/10 269/216 |
| 10,344,467 B1 * | 7/2019 | Wootten .................. | F16B 7/187 |
| 2006/0157532 A1 | 7/2006 | Ball | |
| 2007/0284421 A1 | 12/2007 | Gillotti et al. | |
| 2011/0316135 A1 | 12/2011 | Urushihata | |

FOREIGN PATENT DOCUMENTS

CN    110814455 A *  2/2020

OTHER PUBLICATIONS

OU Publication Feb. 21, 2020 retrieved translation from ESPACENET: https://worldwide.espacenet.com/patent/search/family/069556617/publication/CN110814455A?q=CN%20110814455%20A (Year: 2020).*

Photograph of clamp finger design in use with wirebonding equipment at least as early as Jul. 27, 2022.

* cited by examiner

*Primary Examiner* — Monica S Carter
*Assistant Examiner* — Christopher Soto
(74) *Attorney, Agent, or Firm* — IPTechLaw (57) ABSTRACT

Implementations of a clamp finger may include a first portion including at least one tip configured to clamp a substrate against an anvil during a bonding operation; and a second portion including a first opening therethrough configured to permit coupling of the second portion with a clamping bridge. The first portion may be slidably coupled with the second portion through a rail and the first portion may include an opening therethrough configured to receive a screw that fixedly couples the at least one tip of the first portion at a desired position relative to the second portion.

6 Claims, 7 Drawing Sheets

ADJUSTABLE CLAMP FINGER DESIGN

BACKGROUND

1. Technical Field

Aspects of this document relate generally to clamping systems. More specific implementations involve clamping systems for wirebonding tools.

2. Background

Semiconductor packages are utilized to protect semiconductor die and form interconnections between the semiconductor die and boards or systems designed to utilize the semiconductor die. The semiconductor die can be packaged using a wide variety of package designs including leadless packages and leaded packages. In some semiconductor package designs, the semiconductor die is coupled with a substrate or a leadframe.

SUMMARY

Implementations of a clamp finger may include a first portion including at least one tip configured to clamp a substrate against an anvil during a bonding operation; and a second portion including a first opening therethrough configured to permit coupling of the second portion with a clamping bridge. The first portion may be slidably coupled with the second portion through a rail and the first portion may include an opening therethrough configured to receive a screw that fixedly couples the at least one tip of the first portion at a desired position relative to the second portion.

Implementations of a clamp finger may include one, all, or any of the following:

The second portion further may include a third portion including a setscrew, the third portion fixedly coupled to the second portion.

The rail of the first portion may be included at a first end of the first portion opposite a second end of the first portion that may include the at least one tip.

The screw may bias the rail of the first portion against a corresponding groove in the second portion.

The shape of the rail may be a pin and a shape of the corresponding groove may be a tail forming a dovetail joint.

The cross sectional shape of the rail may be a hexagon and a shape of the corresponding groove may be a corresponding hexagon open on one side of the hexagon.

The clamp finger may be adjustable from a first lower down-set position to a second higher down-set position through sliding the first portion relative to the second portion.

Implementations of a clamp finger may include a tip portion including a rail and a fastening portion including a groove that receives the rail therein and a first opening therethrough configured to permit coupling of the fastening portion with a clamping bridge. The tip portion may include an opening therethrough that receives a screw that fixedly couples the tip portion at a desired position relative to the fastening portion allowing the tip portion to be adjustable from a first lower down-set position to a second higher down-set position through sliding the rail of the tip portion through the groove of the fastening portion.

Implementations of a clamp finger may include one, all, or any of the following:

The fastening portion further may include a retaining portion including a setscrew, the retaining portion fixedly coupled to the fastening portion.

The rail of the tip portion may be included at a first end of the tip portion opposite a second end of the tip portion that may include at least one tip.

The screw may bias the rail of the tip portion against the groove in the fastening portion.

The shape of the rail may be a pin and a shape of the groove may be a tail forming a dovetail joint.

The cross sectional shape of the rail may be a hexagon and a shape of the groove may be a corresponding hexagon open on one side of the hexagon.

Implementations of a clamp finger may include a tip portion including a rail and an opening therethrough; a fastening portion may include a groove that receives the rail therein; and a first opening therethrough configured to permit coupling of the fastening portion with a clamping bridge. A retaining portion may be included that includes a setscrew positioned to retain the rail of the tip portion at a desired tip position configured to clamp a substrate against an anvil during a bonding operation.

Implementations of a clamp finger may include one, all, or any of the following:

The retaining portion may be fixedly coupled to the fastening portion through a screw.

The rail of the tip portion may be included at a first end of the tip portion opposite a second end of the tip portion, the second end including at least one tip.

The screw may bias the rail of the tip portion against the groove in the fastening portion through the opening in the tip portion.

The shape of the rail may be a pin and a shape of the groove may be a tail forming a dovetail joint.

The cross sectional shape of the rail may be a hexagon and a shape of the groove may be a corresponding hexagon open on one side of the hexagon.

The tip portion may be adjustable from a first lower down-set position to a second higher down-set position through sliding the rail of the tip portion through the groove of the fastening portion.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended clamp fingers will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such clamp fingers, and implementing components and methods, consistent with the intended operation and methods.

Figure 1:
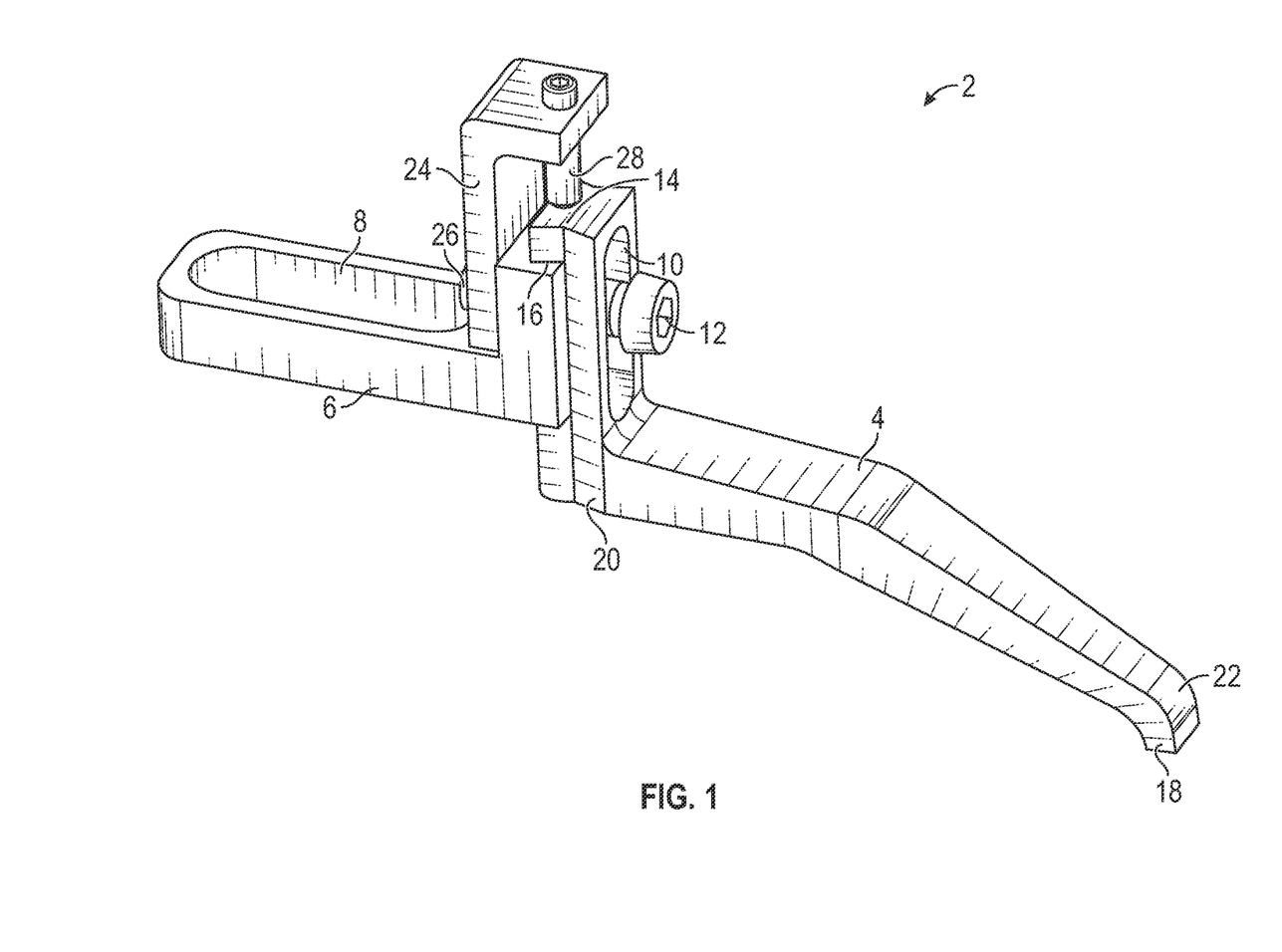
FIG. 1 is a perspective view of a implementation of a clamp finger.

Referring to FIG. 1, an implementation of a clamp finger 2 is illustrated. The clamp finger 2 is used in implementation of wirebonding tools to hold a substrate/leadframe in a fixed position vertically and horizontally while one or more bonding tools in the form of capillaries or wedges forms wirebonds between one or more pads on one or more semiconductor die and the substrate/leadframe. A wide variety of wirebond types and wirebond metal types may be used in combination with the clamp finger implementations disclosed herein.

As illustrated (see also FIGS. 8 and 9), the clamp finger is mounted to a bridge (clamping bridge) in combination with one or more other clamp fingers to surround the substrate/leadframe. The tip portion (first portion) 4 of the clamp finger 2 is used to contact the substrate/leadframe and press it against an anvil located beneath the substrate/leadframe in the wirebonding tool. Fastening portion (second portion) 6 includes a first opening 8 through the thickness of the fastening portion 6 that is designed to receive one or more fastening screws therein which fixedly couple the fastening portion 6 at a desired position at/along the clamping bridge (not shown in FIG. 1). In various implementations, one screw, two screws, or additional screws may be used to fixedly couple the fastening portion to the bridge. Also, in various implementations, additional clamps and/or braces may be used in conjunction with the screws and the opening 8 to assist with fixedly coupling the clamp finger to the clamping bridge.

As illustrated in FIG. 1, the tip portion 4 includes an opening 10 therethrough that is sized to receive screw 12 therethrough. Screw 12 is designed to fixedly couple the tip portion 4 against the fastening portion 6. As illustrated in FIG. 1, the tip portion 4 includes a rail 14 that is slidably received into a correspondingly shaped groove 16. After sliding the rail 14 into the groove 16, screw 12 is then tightened and the end of the screw 12 biases the rail 14 against the groove 16, causing the rail 14 to cease slidably moving within the groove 16 and the tip portion 4 to correspondingly cease moving relative to the fastening portion 6. In this way, the position of the tip 18 of the tip portion 4 is set at a desired location relative to the substrate/leadframe and/or anvil of the wirebonding tool once the clamping bridge is fastened to the wirebonding tool. In some implementations (see the implementation of FIG. 2 for example), the screw 12 may enter one or more screw holes in the fastening portion 6 at are provided at predetermined location(s) to allow the screw 12 to retain the tip portion at the opening 10 against the fastening portion on its own at a desired up/down position along the opening 10. As illustrated in FIG. 1, the rail 14 is located at a first end 20 of the tip portion 4 that is opposite a second end 22 that includes the tip 18. In the implementation illustrated, the rail 14 extends away from the first end 20 at a convex angle close to 90 degrees. In particular implementations, the rail 14 may extend from the first end 20 at a convex angle between about 90 degrees to about 160 degrees depending on the particular shape of the tip portion.

In various implementations, like the one illustrated in FIG. 1, to assist in retaining the tip portion 4 at the desired position against the upward force exerted by the substrate/leadframe and anvil when the clamp finger is installed in the clamping bridge, a retaining portion 24 (third portion) is included. This retaining portion 24 is fixedly coupled to the fastening portion 6 using a screw 26 at a portion of the fastening portion 6 that extends away from an end of the fastening portion at substantially 90 degrees (though a range of other angles greater or smaller than 90 degrees may be used in various implementations. As illustrated in FIG. 1, the retaining portion 24 includes a setscrew 28 that is designed to rotate until it contacts an end of the rail 14, thus preventing the rail 14 from sliding against the upward force in the groove 16. In this way, both the screw 12 and the setscrew 28 work to hold the tip portion 4 in a desired position during operation by providing supporting bias against the rail 14 in two substantially perpendicular directions. While the retaining portion 24 is illustrated as being used in the implementation of FIG. 1, in various implementations, the retaining portion 24 may not be used.

While the use of a set screw that adjusts in the same axis as the movement of the rail is illustrated in FIG. 1, in other implementations, a rod may be employed rather than setscrew 28 that is held in position using a setscrew that tightens into a side of the rod below the upper flange of the retaining portion 24, thus preventing the rod from moving. Differently sized rods could be employed to set different support distances between the upper flange of the retaining portion 24 and the end of the rail 14 in various implementations.

A wide variety of cross sectional shapes for the rail and corresponding groove may be employed in various clamp finger implementations. While the rail and corresponding groove are attached to another structure or include an opening to receive the rail, respectively, and therefore do not strictly have an independent closed cross sectional shape, as used herein, the cut across shape of the rail and corresponding groove will be referred to as a "cross section shape" using closed shape geometric terms for the purposes of simpler explanation.

Figure 2:
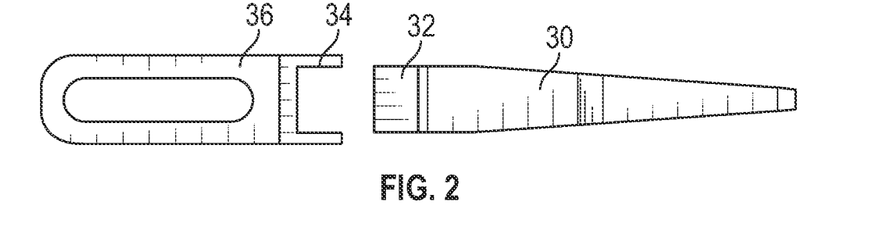
FIG. 2 is a top view of an implementation of a clamping portion and a tip portion of a clamp finger.

Referring to FIG. 2, a top view of an implementation of a tip portion 30 with a rail 32 with a rectangular cross sectional shape is illustrated. The corresponding groove 34 is likewise rectangular in cross section and is designed to receive the rail 32 on both sides of the rail 32 at a depth into the fastening portion 36 that prevents the rail 32 from moving from side to side when the rail 32 is inserted into the groove 34. This particular design, while preventing side-to-side movement, still allows for movement into and out of the paper (up/down movement) as the rail 32 is still structurally free to move in these directions as the groove 34 does not contain any structure that mechanically prevents the up/down movement of the rail 32. In such implementations, the retaining portion may include additional features designed to fix the rail within the groove against up/down movement, such as, by non-limiting example, a cap structure that receives the entire shape of the end of the rail, the setscrew entering a screw hole in the end of the rail a predetermined distance to fix the end of the rail in position, and any other system for holding the end of the rain in a fixed position. Also in various implementations, the screw that passes through the opening in the end of the tip portion may enter a fixed position screw hole in the fastening portion and the tip portion slid upwardly and downwardly to a desired position at which point the screw is tightened down to prevent further up/down movement of the tip portion. The use of a screw hole in the fastening portion may be the primary way of retaining the tip portion fixedly against the fastening portion at the desired up/down position in these clamp finger implementations.

Figure 3:
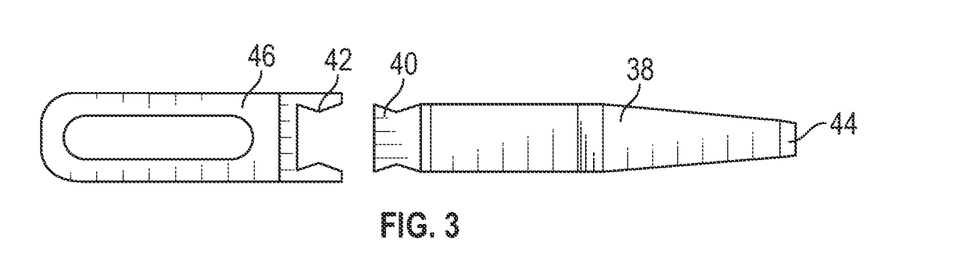
FIG. 3 is a top view of another implementation of a clamping portion and a tip portion of a clamp finger.

Referring to FIG. 3, an implementation of a tip portion 38 with a rail 40 that forms a pin with corresponding groove 42 forming a tail that together form a dovetail joint. The advantage of the use of a dovetail joint is that it may prevent side-to-side movement of the tip portion 38 and also prevent additional upward and downward movement of the tip 44 relative to the fastening portion 46 through the additional mechanical reinforcement of the dovetail structure. Also, implementations where a dovetail joint is used, the need to provide any screw holes in the fastening portion to receive the screw through the opening of the tip portion may not be necessary. This is because the screw can operate to secure the rail 40 in the groove 42 by biasing the end of the screw only against the surface of the groove 42 itself and thus using the mechanical retention of the structure of the dovetail joint to eliminate the possibility of up/down movement of the rail in the groove.

Figure 4:
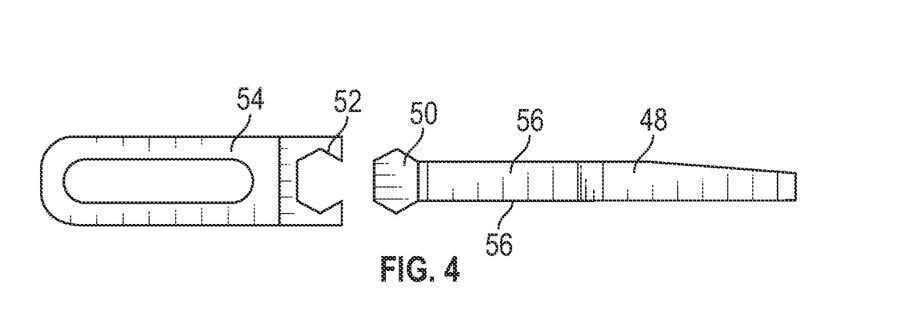
FIG. 4 is a top view of another implementation of a clamping portion and a tip portion of a clamp finger.

Referring to FIG. 4, an implementation of a tip portion 48 is illustrated that includes a rail 50 that has a cross sectional shape of a hexagon along with a corresponding groove 52 that also includes a hexagonal shape (missing one side) formed in the fastening portion 54. As illustrated in FIG. 4, the dimensions of the rail 50 extend beyond the sidewalls 56 of the tip portion 48 in contrast with the rail designs of FIGS. 2-3. As with the dovetail joint design illustrated in FIG. 3, the use of the hexagonal shape for the rail and the groove may also eliminate the need to provide screw holes in the fastening portion as the screw can prevent movement of the tip portion by biasing the screw end against the groove itself. These three non-limiting examples of rail and groove designs demonstrate that persons of ordinary skill can construct many other variations of rails and corresponding grooves, including the selection of whether screw hole(s) will be provided in the fastening portion or not, using the principles disclosed herein that include a wide variety of cross sectional shapes for the rails and the grooves.

Figure 5:
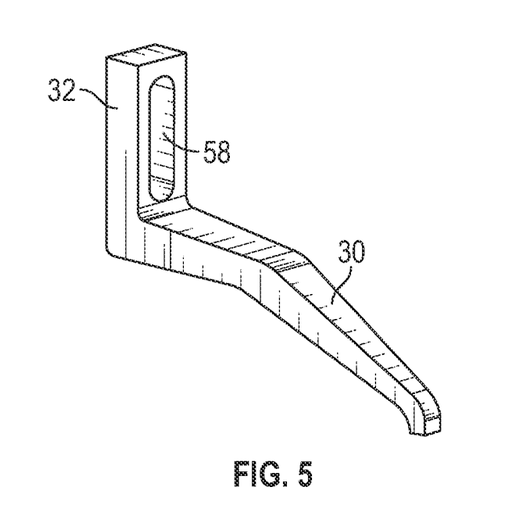
FIG. 5 is a perspective view of the tip portion of the implementation of a clamp finger illustrated in FIG. 2.
Figure 6:
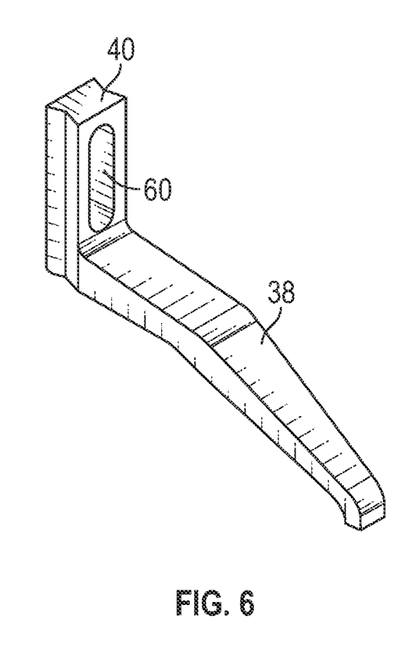
FIG. 6 is a perspective view of the tip portion of the implementation of a clamp finger illustrated in FIG. 3.
Figure 7:
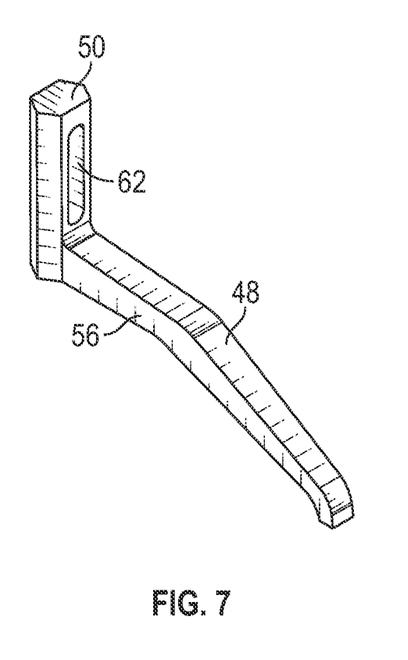
FIG. 7 is a perspective view of the tip portion of the implementation of a clamp finger illustrated in FIG. 4.

Referring to FIG. 5, the tip portion 30 of FIG. 2 illustrated in a perspective view, showing the structure of the rail 32. From this view, it is evident that because of the lack of mechanical retention of the groove for the rail, the surface of the opening 58 will need to be used, along with the screw head in combination with one or more screw openings in the fastening portion, to retain the rail 32 in position in the groove. FIG. 6 illustrates the tip portion 38 of FIG. 3 with the rail 40 that forms the pin portion of the dovetail joint with the fastening portion 46. FIG. 7 illustrates a perspective view of the tip portion 48 and rail 50 showing how the rail 50 extends beyond the sidewalls 56 of the tip portion 48. In each of these rail variations, the ability to fix the rail in position relative to the respective fastening portion using the screw in contact with the groove of the respective fastening portion through the openings 58, 60, 62 is illustrated.

Figure 8:
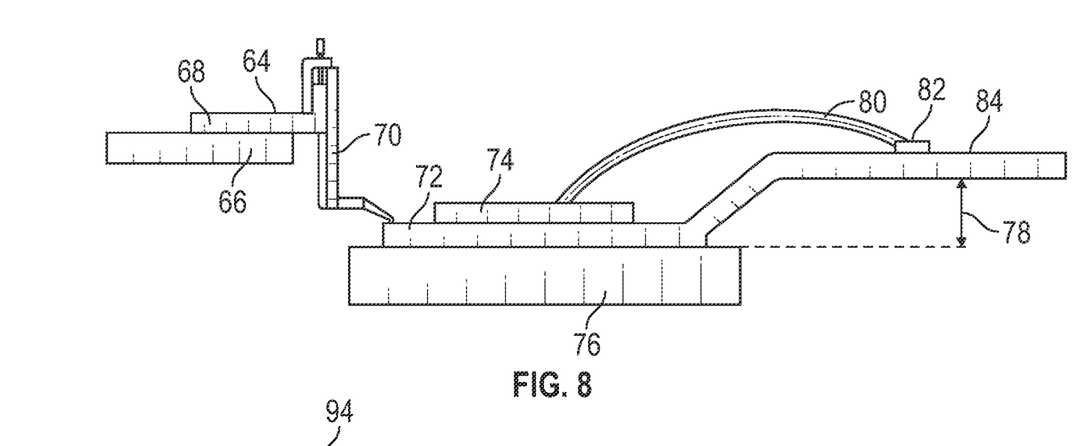
FIG. 8 is a side view of an implementation of a clamp finger with the tip portion adjusted at a low down-set position.

Referring to FIG. 8, an implementation of a clamp finger 64 is illustrated fastened to bridge 66 using fastening portion 68. Here, the tip portion 70 has been adjusted to a desired position/height above anvil 76 to rest firmly against leadframe 72 to which semiconductor die 74 has been bonded. Here the setscrew in the fastening portion 68 is at a higher position because the rail of the tip portion 70 is in a higher position to accommodate the low down-set distance 78. A raised portion 84 of the leadframe 72 has the low down-set distance 78 which means that the position of the leadframe 72 relative to the bridge 66 is a first, closer distance to the bridge 66. Bond wire 80 is illustrated coupling die to a bonding location/bond pad 82 on the raised portion 84. The clamp finger 64 works to hold the leadframe 72 in position during the formation process of the bond wire 80.

Figure 9:
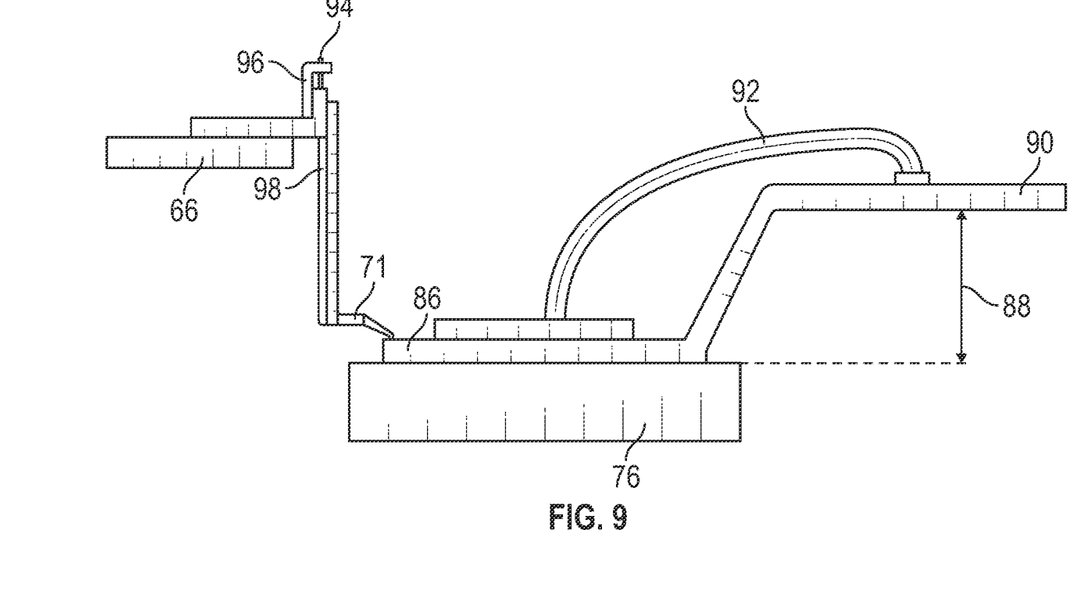
FIG. 9 is a side view of an implementation of a clamp finger with the tip portion adjust at a high down-set portion.

FIG. 9 illustrates the clamp finger 64 being used with a leadframe 86 that has a high down-set distance 88 as the raised portion 90 is higher above the anvil 76 than the leadframe implementation illustrated in FIG. 8 resulting in a greater distance between the bridge 66 and the anvil 76. In this implementation, the length of the tip portion 71 in this design is also longer than the length of the tip portion 70 in the implementation of FIG. 8, through exchanging the two tip portions with the fastening portion 66. This exchangeability can provide great flexibility and reduces the number of total clamp finger components needed to handle various leadframe designs. In contrast, clamp finger designs that are formed of a single piece of metal lack any ability to adjust or set a height of their tip portion to work with both the down-set distance of the leadframe of FIG. 8 and the down-set distance of the leadframe of FIG. 9. Instead, such single piece clamp finger designs would be unable to reach the leadframe of FIG. 9 if sized for the leadframe of FIG. 8, due to the requirement that the distance between the anvil 76 and the clamping bridge 66 be increased to permit the bonding process for the bond wire 92 to be successfully performed. The implementations disclosed herein, can allow for the tip portion to be adjusted downwardly using a rail 98 and groove structure like those illustrated herein while being supported in place with setscrew 94 of retaining portion 96. In this way, the same tip portion of a clamp finger can be used for multiple leadframe types with varied down-set distances without requiring the purchase of multiple sets of clamp fingers each separately machined with tips that reach to a certain down-set distance. In other implementations, as illustrated in FIG. 9, the tip portion 70 can be exchanged with the tip portion 71, allowing for the length of the tip portion to be mechanically changed through using a longer tip portion.

Furthermore, during repeated wirebonding operation, it has been observed that the metal of the ends of the tips of the clamp finger tip portions wear under the pressure and movement of the leadframe against the tips during processing of multiple substrates/leadframes through the wirebonding tool. Thus, at some point during operation, given enough wear, a given clamp finger may no longer be able to securely hold the leadframe/substrate in position and the clamp finger then has to be entirely discarded as unsuitable for future use.

This challenge of having multiple sets of clamp fingers and the corresponding metal wear out may not be so difficult if the tips of the clamp fingers all were of the same shape and dimensions. However, to accommodate leadframes/substrates of many different sizes and shapes, a wide variety of tip designs are utilized, thus greatly multiplying the possible numbers of clamp finger designs at each down-set distance that have to be maintained for each wirebonding tool to be able to be set up for a given mix of leadframes/substrates. Thus, the ability to entirely remove a given tip portion from the fastening portion of a clamp finger and replace that tip portion with the same or a different tip portion, in combination with the ability to adjust that tip portion to a desired down-set distance position may greatly reduce the amount of clamp finger types needed for each wire bonding tool to handle a given mix of leadframes/substrates in a manufacturing setting.

Figure 10:
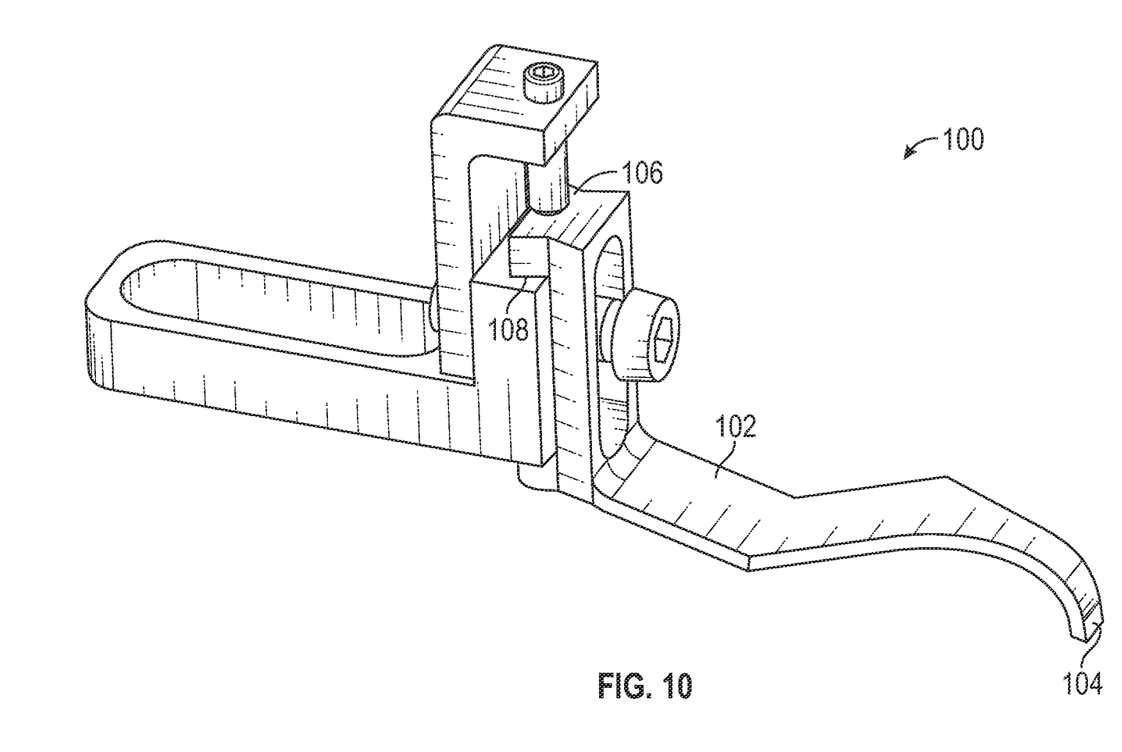
FIG. 10 is a perspective view of another implementation of a clamp finger with a tip portion with an offset.
Figure 11:
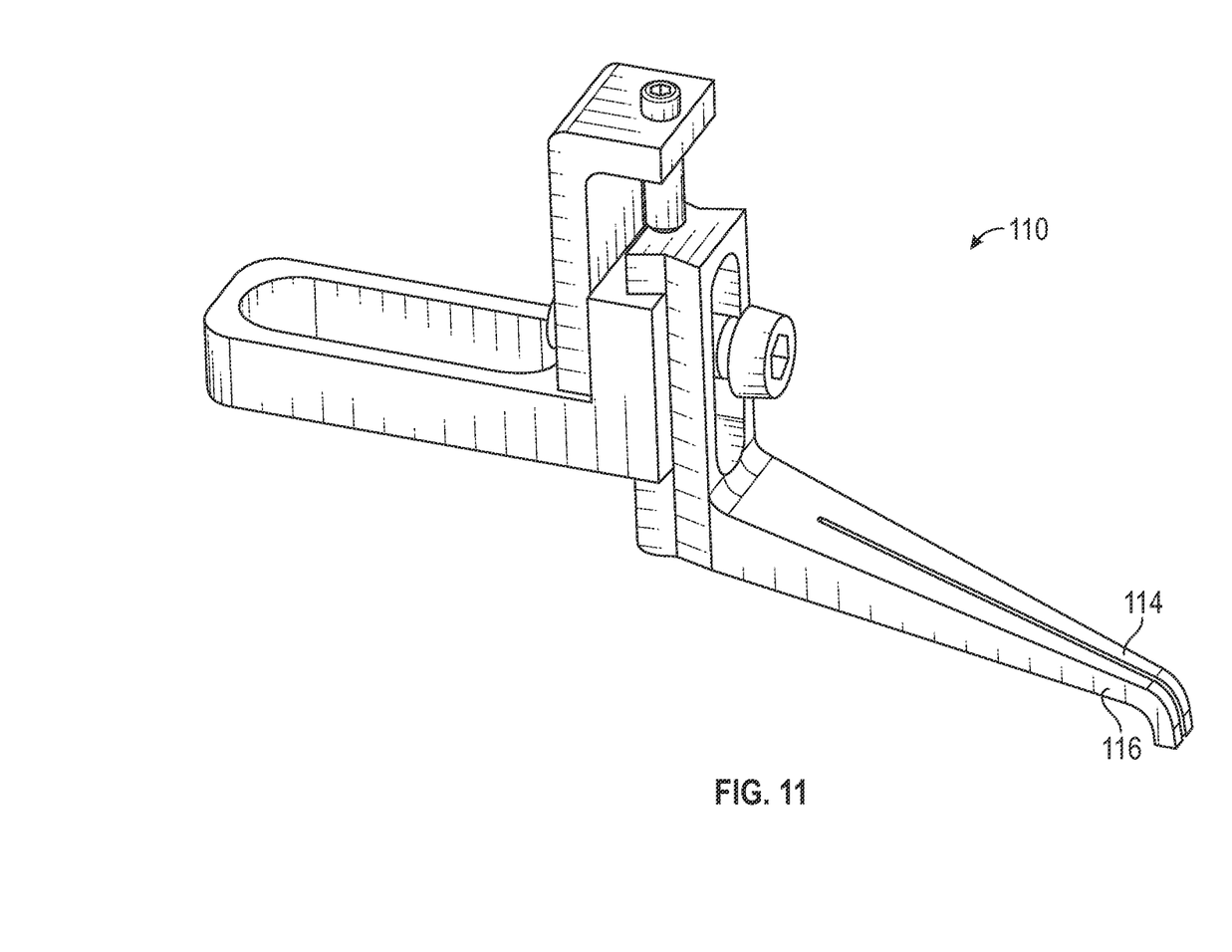
FIG. 11 is a perspective view of another implementation of a clamp finger with a divided tip portion.
Figure 12:
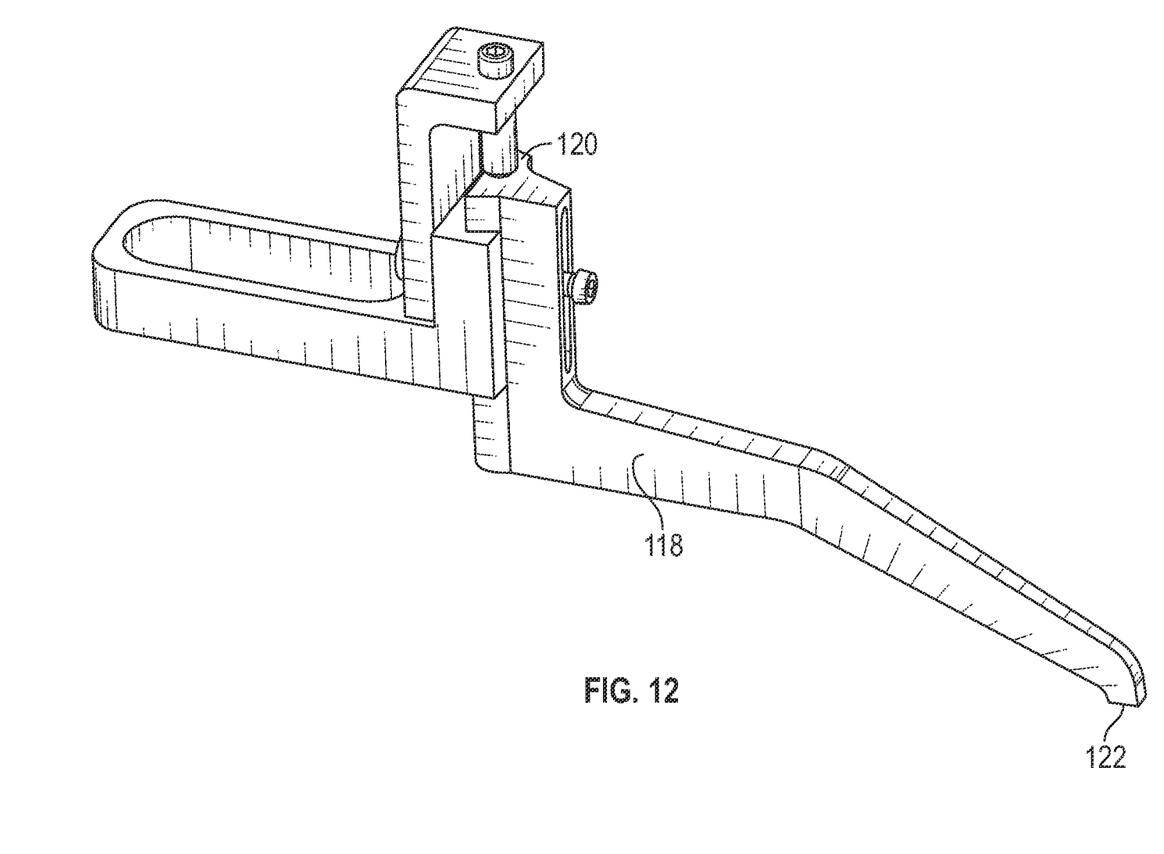
FIG. 12 is a perspective view of another implementation of a clamp finger with a tip finger offset to one side relative to a rail of the tip finger.

Referring to FIG. 10, an implementation of a clamp finger 100 with a tip portion 102 with an offset to the right, placing the tip 104 to the right of the longest horizontal dimension of the clamp finger 100, is illustrated. This is one example of one of the many possible tip designs which can be exchanged and adjusted using the rail/groove 106/108 system of the clamp finger. Other offset designs to the left of the longest horizontal dimension may also be used in various tip portion implementations. FIG. 11 illustrates a clamp finger 110 that has a tip portion 112 that is bifurcated/divided into two portions 114, 116. More than just two portions may be utilized in various tip portion implementation as desired and these may also be offset to the right or the left from a longest horizontal dimension of the clamp finger in various implementations. Finally, referring to FIG. 12, in some implementations, the position of the tip portion 118 relative to the rail 120 may be offset to one side or the other (right of left) to shift the position of the tip 122 correspondingly to that side.

Any of the foregoing tip portion designs can be used in various combinations with each other in any given clamp finger set up in various implementations. The various resulting clamp fingers may be fastened to the same bridge during a tool set up operation to accommodate the dimensions of a substrate/leadframe during wirebonding with the wirebonding tool. The ability to adjust the height and/or exchange the tip design may speed up the tool set up process as it reduces the amount of finger clamps that may need to be adjusted and changed compared to situations where clamp fingers made of a non-adjustable single piece of metal are utilized. Also, defects and operating problems caused by wear out of the clamp finger tips can be adjusted for during each set up, reducing the odds that a given clamp finger tip will wear sufficiently to cause defects or scrap during operation of the wirebonding tool by failing to retain the substrate/leadframe sufficiently in place.

A wide variety of materials may be used to form the components of the various clamp finger implementations disclosed herein including, by non-limiting example, metals, metal alloys, composites, and any other material capable of providing sufficient mechanical support between the bridge and leadframe/substrate. The various components of the clamp fingers may be made of the same or different materials depending on various factors, including, by non-limiting example, mechanical strength, durability, cost, ease of machining, ease of formation, or any other design characteristic. Those of ordinary skill will readily be able to select the appropriate materials and combinations of materials using the principles disclosed in this document.

In places where the description above refers to particular implementations of clamp fingers and implementing components, sub-components, methods and sub-methods, it should be readily apparent that a number of modifications may be made without departing from the spirit thereof and that these implementations, implementing components, sub-components, methods and sub-methods may be applied to other clamp fingers.

What is claimed is:

1. A clamp finger comprising:
    a tip portion comprising a rail at a first end and an opening therethrough at the first end;
    a fastening portion comprising:
        a groove that slidably receives the rail therein; and
        a first opening therethrough configured to permit coupling of the fastening portion with a clamping bridge; and
        a retaining portion comprising a setscrew positioned to retain the rail of the tip portion at a desired tip position configured to clamp a substrate against an anvil during a bonding operation;
        wherein the retaining portion is fixedly coupled to the fastening portion through a screw.

2. The clamp finger of claim 1, wherein the first end of the tip portion is opposite a second end of the tip portion, the second end comprising at least one tip.

3. The clamp finger of claim 1, wherein a screw biases the rail of the tip portion against the groove in the fastening portion through the opening in the tip portion.

4. The clamp finger of claim 3, wherein a shape of the rail is a pin and a shape of the groove is a tail forming a dovetail joint.

5. The clamp finger of claim 3, wherein a cross sectional shape of the rail is a hexagon and a shape of the groove is a corresponding hexagon open on one side of the hexagon.

6. The clamp finger of claim 1, wherein the tip portion is adjustable from a first lower down-set position to a second higher down-set position through sliding the rail of the tip portion through the groove of the fastening portion.

* * * * *